(12) United States Patent
Chen et al.

(10) Patent No.: US 8,743,495 B1
(45) Date of Patent: Jun. 3, 2014

(54) DISK DRIVE DETECTING TRACK SQUEEZE WHEN CIRCULAR TRACKS ARE DEFINED FROM NON-CIRCULAR SERVO TRACKS

(75) Inventors: Min Chen, San Jose, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 370 days.

(21) Appl. No.: 13/153,357

(22) Filed: Jun. 3, 2011

(51) Int. Cl.
*G11B 5/596* (2006.01)

(52) U.S. Cl.
USPC .......................................... 360/55; 360/77.04

(58) Field of Classification Search
None
See application file for complete search history.

(56) References Cited

U.S. PATENT DOCUMENTS

| | | | |
|---|---|---|---|
| 4,404,605 A | 9/1983 | Sakamoto | |
| 4,764,914 A | 8/1988 | Estes et al. | |
| 5,416,759 A | 5/1995 | Chun | |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A | 5/2000 | Shepherd et al. | |
| 6,118,739 A | 9/2000 | Kishinami et al. | |
| 6,128,153 A | 10/2000 | Hasegawa et al. | |
| 6,141,175 A | 10/2000 | Nazarian et al. | |
| 6,181,652 B1 | 1/2001 | Katou et al. | |
| 6,370,094 B1 | 4/2002 | Kishinami et al. | |
| 6,392,834 B1 | 5/2002 | Ellis | |
| 6,421,198 B1 | 7/2002 | Lamberts et al. | |
| 6,442,112 B1 | 8/2002 | Tateishi | |
| 6,476,995 B1 | 11/2002 | Liu et al. | |
| 6,496,322 B1 | 12/2002 | Hasegawa et al. | |
| 6,510,112 B1 | 1/2003 | Sakamoto et al. | |
| 6,522,493 B1 | 2/2003 | Dobbek et al. | |
| 6,563,663 B1 | 5/2003 | Bi et al. | |
| 6,606,214 B1 | 8/2003 | Liu et al. | |
| 6,608,731 B2 | 8/2003 | Szita | |
| 6,611,397 B1 | 8/2003 | Nguyen | |
| 6,624,963 B2 | 9/2003 | Szita | |
| 6,654,198 B2 | 11/2003 | Liu et al. | |
| 6,657,810 B1 | 12/2003 | Kupferman | |
| 6,667,840 B1 | 12/2003 | Cheong et al. | |
| 6,735,040 B2 | 5/2004 | Galloway et al. | |
| 6,751,042 B2 * | 6/2004 | Bi et al. | ...................... 360/77.02 |
| 6,775,091 B1 | 8/2004 | Sutardja | |
| 6,785,084 B2 | 8/2004 | Szita | |
| 6,798,606 B2 | 9/2004 | Tang et al. | |
| 6,862,155 B2 | 3/2005 | Yang et al. | |
| 6,922,304 B2 | 7/2005 | Nakagawa | |

(Continued)

*Primary Examiner* — Wayne Young
*Assistant Examiner* — James L Habermehl

(57) ABSTRACT

A disk drive is disclosed comprising a head actuated over a disk comprising a plurality of non-circular servo tracks for defining a plurality of substantially circular tracks. Each non-circular servo track comprises a plurality of servo sectors defining a plurality of servo wedges. The head is positioned at a first offset relative to a first circular track and a relationship of servo bursts for each servo wedge is first generated. The head is positioned at a second offset relative to the first circular track and the relationship of the servo bursts for each servo wedge is second generated. For each servo wedge, a selection is made between the first generated relationship at the first offset and the second generated relationship at the second offset, and the servo bursts at the selected offset are evaluated to generate a track squeeze indicator.

16 Claims, 8 Drawing Sheets

(56) References Cited

U.S. PATENT DOCUMENTS

| | | | |
|---|---|---|---|
| 6,937,420 B1 | 8/2005 | McNab et al. |
| 6,952,320 B1 | 10/2005 | Pollock et al. |
| 6,965,491 B1 | 11/2005 | Perlmutter et al. |
| 6,972,540 B1 | 12/2005 | Wang et al. |
| 6,972,922 B1 | 12/2005 | Subrahmanyam et al. |
| 6,975,478 B2 | 12/2005 | Fukushima et al. |
| 6,977,792 B1 | 12/2005 | Melrose et al. |
| 6,995,941 B1 | 2/2006 | Miyamura et al. |
| 6,999,266 B1 | 2/2006 | Schmidt |
| 7,002,767 B2 | 2/2006 | Annampedu et al. |
| 7,012,778 B2 | 3/2006 | Shigematsu |
| 7,027,255 B2 * | 4/2006 | Schmidt | 360/77.08 |
| 7,054,096 B1 | 5/2006 | Sun et al. |
| 7,057,836 B1 | 6/2006 | Kupferman |
| 7,068,451 B1 | 6/2006 | Wang et al. |
| 7,106,542 B1 | 9/2006 | Sun et al. |
| 7,106,547 B1 | 9/2006 | Hargarten et al. |
| 7,110,209 B2 | 9/2006 | Ehrlich et al. |
| 7,119,981 B2 | 10/2006 | Hanson et al. |
| 7,123,433 B1 | 10/2006 | Melrose et al. |
| 7,167,336 B1 | 1/2007 | Ehrlich et al. |
| 7,230,786 B1 | 6/2007 | Ray et al. |
| 7,257,062 B2 | 8/2007 | Li et al. |
| 7,271,977 B1 | 9/2007 | Melrose et al. |
| 7,286,317 B1 | 10/2007 | Li et al. |
| 7,315,431 B1 | 1/2008 | Perlmutter et al. |
| 7,317,669 B2 | 1/2008 | Lee |
| 7,330,322 B2 | 2/2008 | Hanson et al. |
| 7,333,280 B1 | 2/2008 | Lifchits et al. |
| 7,333,287 B2 | 2/2008 | Hara |
| 7,333,288 B2 | 2/2008 | Kim et al. |
| 7,391,584 B1 | 6/2008 | Sheh et al. |
| 7,408,735 B1 | 8/2008 | Coric |
| 7,436,742 B2 | 10/2008 | Yanagawa |
| 7,457,075 B2 | 11/2008 | Liu et al. |
| 7,460,328 B2 * | 12/2008 | Chase et al. | 360/75 |
| 7,460,330 B2 | 12/2008 | Takaishi |
| 7,474,491 B2 * | 1/2009 | Liikanen et al. | 360/75 |
| 7,477,473 B2 * | 1/2009 | Patapoutian et al. | 360/77.04 |
| 7,489,469 B2 * | 2/2009 | Sun et al. | 360/77.04 |
| 7,525,754 B2 | 4/2009 | Melrose et al. |
| 7,551,387 B2 | 6/2009 | Sun et al. |
| 7,561,361 B1 | 7/2009 | Rutherford |
| 7,639,447 B1 | 12/2009 | Yu et al. |
| 7,646,559 B1 | 1/2010 | Cheung et al. |
| 7,656,604 B1 | 2/2010 | Liang et al. |
| 7,663,835 B1 | 2/2010 | Yu et al. |
| 7,715,138 B1 | 5/2010 | Kupferman |
| 7,760,455 B2 * | 7/2010 | Kang et al. | 360/77.04 |
| 7,773,328 B1 | 8/2010 | Katchmart et al. |
| 7,791,832 B1 | 9/2010 | Cheung et al. |
| 7,796,479 B2 | 9/2010 | Kim et al. |
| 7,800,859 B2 * | 9/2010 | Moriya et al. | 360/77.02 |
| 7,839,591 B1 | 11/2010 | Weerasooriya et al. |
| 7,876,523 B1 | 1/2011 | Panyavoravaj et al. |
| 7,881,005 B1 | 2/2011 | Cheung et al. |
| 7,924,519 B2 | 4/2011 | Lambert |
| 8,059,360 B1 | 11/2011 | Melkote et al. |
| 8,077,428 B1 | 12/2011 | Chen et al. |
| 8,116,025 B1 | 2/2012 | Chan et al. |
| 8,174,941 B2 | 5/2012 | Takazawa et al. |
| 8,537,486 B2 | 9/2013 | Liang et al. |
| 2001/0040755 A1 | 11/2001 | Szita |
| 2002/0067567 A1 | 6/2002 | Szita |
| 2003/0218814 A9 | 11/2003 | Min et al. |
| 2005/0152246 A1 | 7/2005 | Li et al. |
| 2005/0185319 A1 | 8/2005 | Liu et al. |
| 2005/0275964 A1 | 12/2005 | Hara |
| 2007/0096678 A1 | 5/2007 | Melrose |
| 2007/0097806 A1 * | 5/2007 | Beker et al. | 369/30.12 |
| 2007/0297088 A1 | 12/2007 | Sun et al. |
| 2008/0186617 A1 | 8/2008 | Hosono et al. |
| 2008/0239555 A1 | 10/2008 | Ehrlich et al. |
| 2009/0002874 A1 | 1/2009 | Melrose et al. |
| 2009/0052081 A1 * | 2/2009 | Chase et al. | 360/77.08 |
| 2009/0086364 A1 | 4/2009 | Gerasimov |
| 2010/0020428 A1 | 1/2010 | Mochizuki et al. |
| 2010/0195235 A1 | 8/2010 | Vikramaditya et al. |
| 2010/0214686 A1 | 8/2010 | Higa et al. |
| 2012/0033317 A1 * | 2/2012 | Szita | 360/31 |
| 2012/0275050 A1 | 11/2012 | Wilson et al. |

* cited by examiner

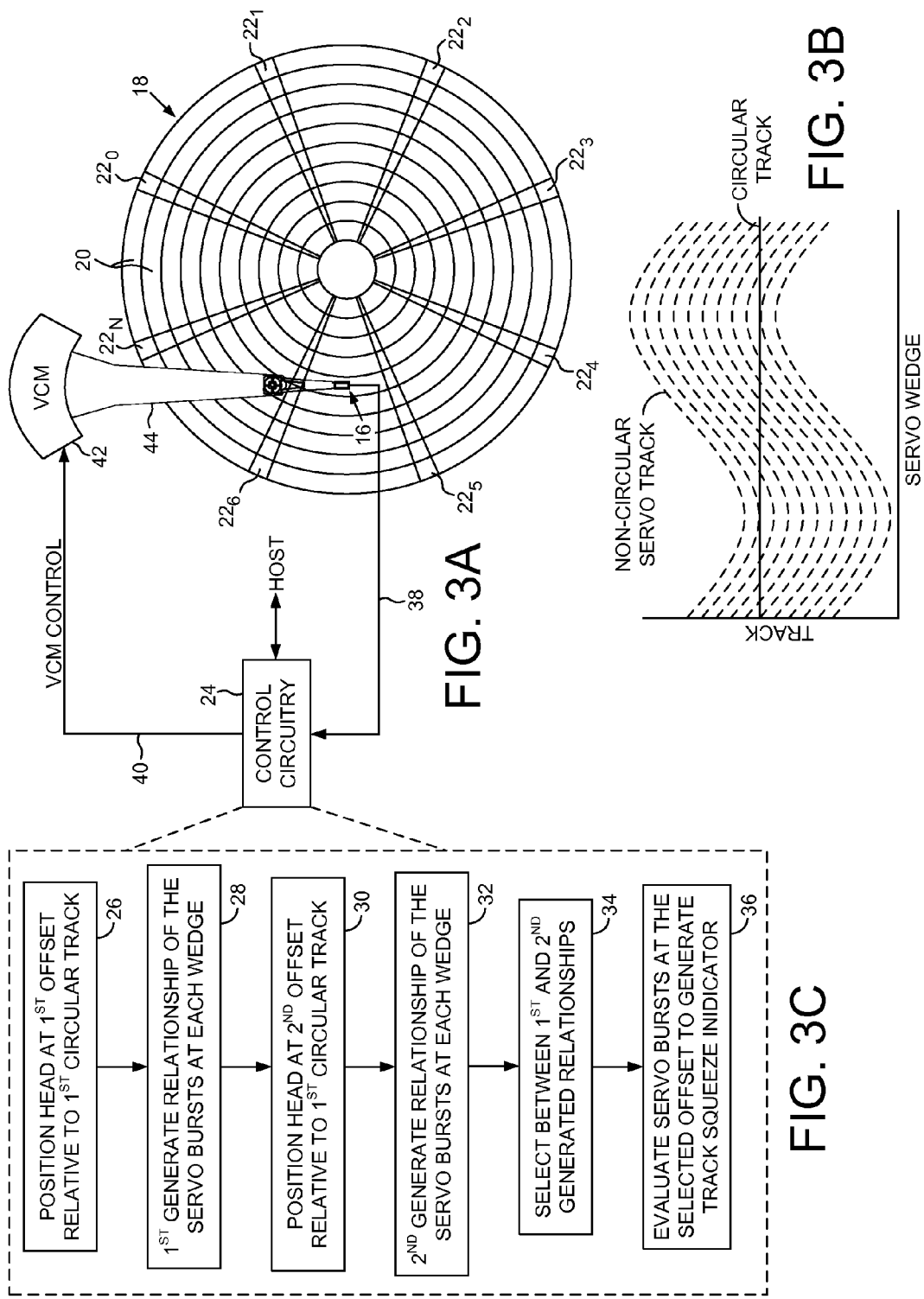

US 8,743,495 B1

DISK DRIVE DETECTING TRACK SQUEEZE WHEN CIRCULAR TRACKS ARE DEFINED FROM NON-CIRCULAR SERVO TRACKS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $4_i$ further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

In some cases, the servo tracks defined by the servo sectors will comprise an eccentricity due, for example, to a noncentric alignment of the disk with the spindle motor. The eccentricity of servo tracks is particularly apparent when the servo sectors are written by a media writer prior to clamping the disk to the spindle motor of a disk drive as compared to writing the servo sectors after installing the disk into the disk drive. In certain designs, the eccentricity of the servo tracks is accounted for by cancelling the effect from the position error signal (PES) used to servo the head in response to the servo sectors, thereby defining substantially circular tracks.

If the data tracks are defined too close to one another (track squeeze), the reliability of the written data may decrease due to adjacent track interference. Accordingly, it may be desirable to verify the spacing of the tracks as part of a validation of each production disk drive, or as feedback for optimizing the servo writing process and/or for optimizing the servo controller. A known method for detecting track squeeze is illustrated in FIGS. 2A-2D wherein in FIG. 2A a track squeeze occurs due to a deviation in the sinusoid representing the C servo burst relative to an offset from the centerline of a track (e.g., because the C servo burst was written incorrectly). FIG. 2B shows the resulting perturbation in the position error signal (PES) generated from reading the servo bursts.

The track squeeze may be detected by evaluating the servo bursts at selected offsets from a track centerline. For example, a prior art technique for detecting a track squeeze condition is to generate a track squeeze indicator (TSI) according to:

$$(A-B)^2 + (C-D)^2.$$

FIG. 2C illustrates the above track squeeze indicator relative to the PES of FIG. 2B and the corresponding track squeeze condition. As shown in FIG. 2C, the track squeeze indicator is more pronounced at offsets of zero and one-half of a track as compared to offsets of one-quarter and three-quarters of a track. This is further illustrated in FIG. 2D which shows a normal magnitude of the track squeeze indicator (solid line) and the deviation of the track squeeze indicator (dashed line) due to the track squeeze condition. As illustrated in FIG. 2D, the deviation is most pronounced along the diagonal lines where (A-B) equals (C-D) which corresponds to the zero offset and one-half track offset shown in FIG. 2C.

BRIEF DESCRIPTION OF THE DRAWINGS

FIG. 3A shows a disk drive according to an embodiment of the present invention comprising a head actuated over a disk having a plurality of non-circular servo tracks.

FIG. 3B illustrates a circular track defined relative to the non-circular servo tracks according to an embodiment of the present invention.

FIG. 3C is a flow diagram according to an embodiment of the present invention wherein a track squeeze indicator is generated by evaluating a relationship of servo bursts at each servo wedge at a selected offset out of a plurality of offsets.

DETAILED DESCRIPTION OF EMBODIMENTS OF THE INVENTION

Figure 1:
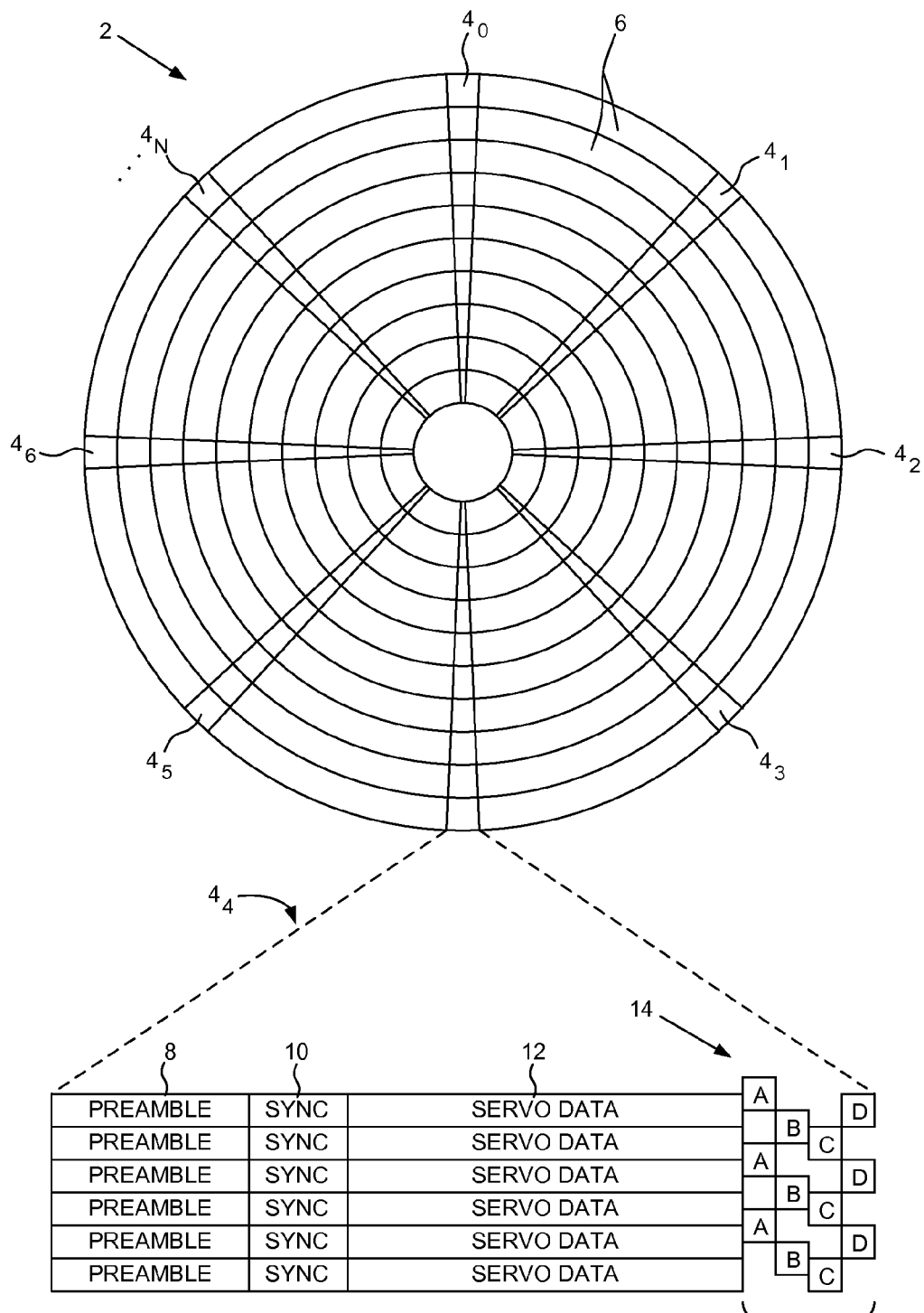
FIG. 1 shows a prior art disk format comprising a plurality of tracks defined by embedded servo sectors.

FIG. 3A shows a disk drive according to an embodiment of the present invention comprising a head 16 actuated over a disk 18 comprising a plurality of non-circular servo tracks 20 for defining a plurality of substantially circular tracks (FIG. 3B). Each non-circular servo track 20 comprises a plurality of servo sectors $22_0$-$22_N$ defining a plurality of servo wedges, wherein each servo sector comprises a plurality of servo bursts. The disk drive further comprises control circuitry 24 operable to execute the flow diagram of FIG. 3C wherein the head is positioned at a first offset relative to a first circular track (step 26) and a relationship of the servo bursts for each servo wedge is first generated (step 28). The head is positioned at a second offset relative to the first circular track (step 30) and the relationship of the servo bursts for each servo wedge is second generated (step 32). For each servo wedge, a selection is made between the first generated relationship at the first offset and the second generated relationship at the second offset (step 34), and the servo bursts are evaluated at the selected offset to generate a track squeeze indicator (step 36).

In the embodiment of FIG. 3A, the control circuitry 24 processes a read signal 38 emanating from the head 16 to demodulate the servo sectors $22_0$-$22_N$ into a position error signal (PES). The PES is filtered with a suitable compensation filter to generate a control signal 40 applied to a voice coil motor (VCM) 42 which rotates an actuator arm 44 about a pivot in order to position the head 16 radially over the disk 18 in a direction that reduces the PES.

The servo sectors $22_0$-$22_N$ may comprise any suitable position information, such as a track address for coarse positioning and servo bursts for fine positioning. In one embodiment, the servo bursts may comprise a quadrature servo pattern comprising A, B, C and D servo bursts as shown in FIG. 1. The servo bursts may be recorded in any suitable order, wherein in one embodiment the servo bursts are recorded in the order A, C, D, B (rather than A,B,C,D as shown in FIG. 1). Other types of servo bursts may also be employed in the embodiments of the present invention, such as phase-based servo bursts, wherein a track squeeze indicator is more accurately generated when the head is at a particular offset relative to the servo bursts.

Figure 6:
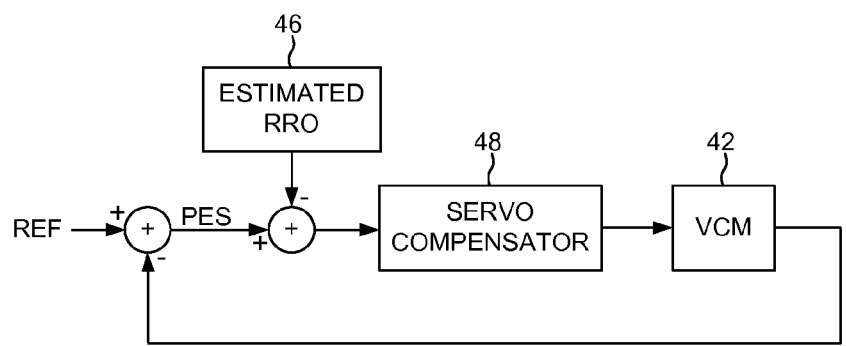
FIG. 6 shows an embodiment of the present invention wherein repeatable runout (RRO) values are estimated and subtracted from a position error signal (PES) so that the head follows the circular tracks (ignores the eccentricity of the non-circular servo tracks).

The non-circular servo tracks 20 in the embodiment of FIG. 3A may be due to one or more influences, such as eccentricity introduces when writing the servo tracks, and/or eccentricity introduced when clamping the disk 18 to a spindle motor. In the embodiment of FIG. 3B, the resulting eccentricity of the non-circular servo tracks 20 is sinusoidal with a fundamental frequency defined by the rotation of the disk. Referring to FIG. 6, the eccentricity of the non-circular servo tracks 20 may be estimated, and repeatable runout (RRO) values 46 introduced into the servo system (e.g., subtracted from the PES prior to the servo compensator 48) so that the head follows the substantially circular track shown in FIG. 3B. The circular track shown in FIG. 3B may be a servo track or a data track, wherein in one embodiment a plurality of circular data tracks may be defined between two consecutive circular servo tracks (i.e., the density of the circular data tracks may be greater than the circular servo tracks).

Figure 2A:
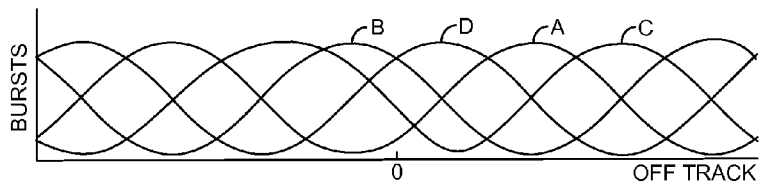
FIGS. 2A-2D illustrate a prior art method for detecting track squeeze by generating a track squeeze indicator at specific track offsets.
Figure 2B:
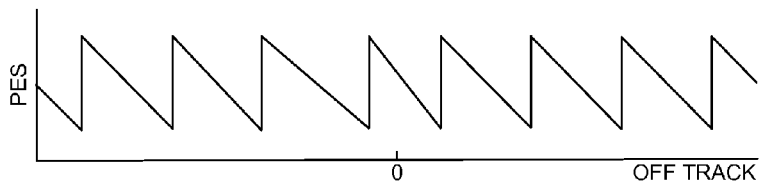
Figure 2C:
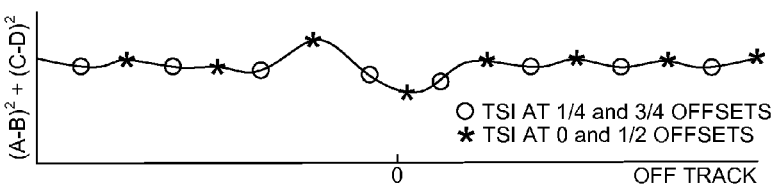
Figure 4A:
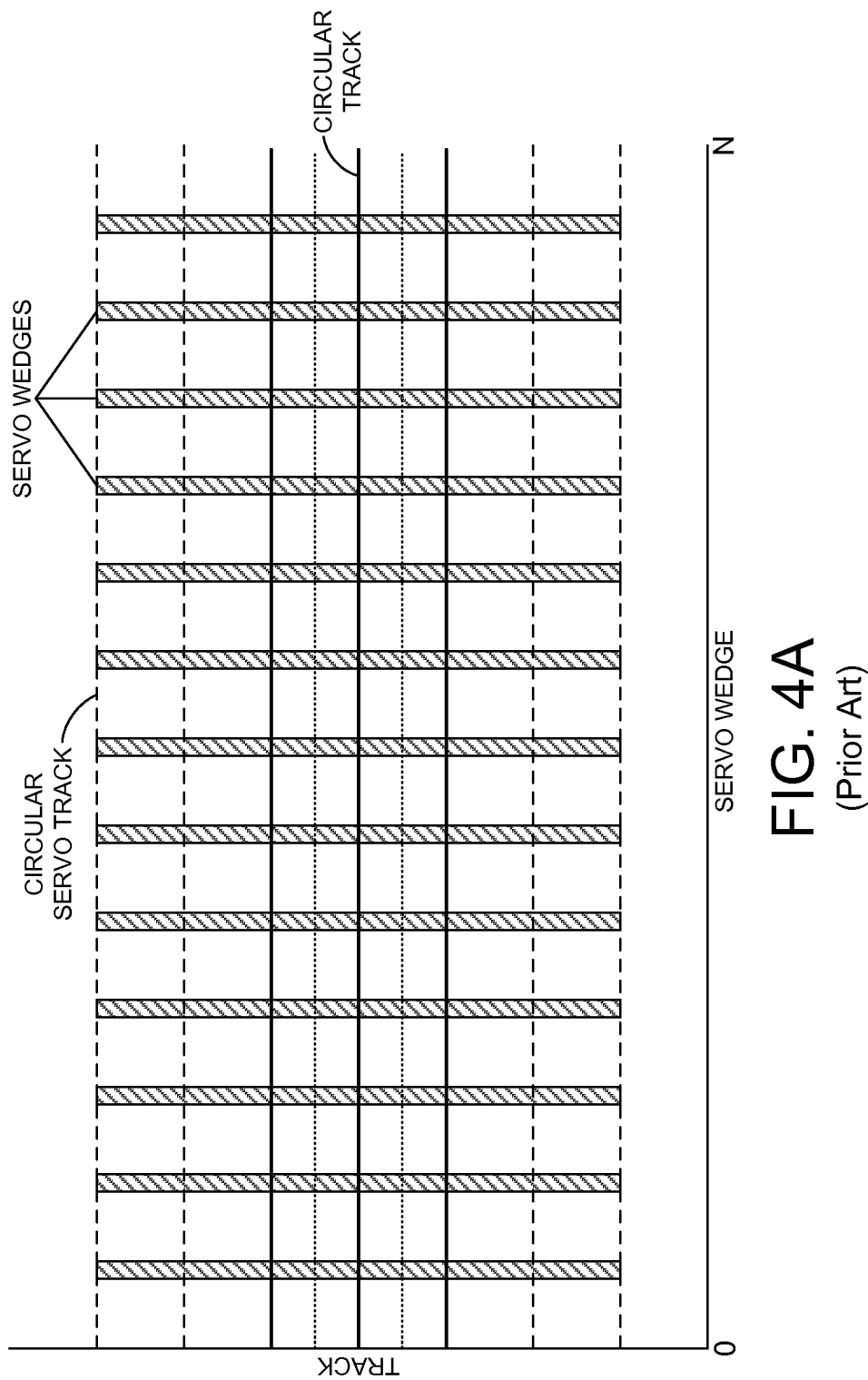
FIG. 4A illustrates a prior art track format wherein circular tracks (servo or data) are defined by circular servo tracks, and a track squeeze indicator is generated by evaluating the servo bursts at specific offsets relative to a circular track.

FIG. 4A illustrates a prior art track format wherein the servo tracks and the tracks defined by the servo tracks are both circular. When the head is positioned at an offset of one-half a track (shown as a dotted line in FIG. 4A), the head will cross over the servo sectors at essentially the same point defined by the servo bursts. That is, the servo sectors will not be moving radially relative to the head since the servo tracks are circular. Accordingly, a track squeeze indicator may be generated by positioning the head at specific offsets relative to a circular track (e.g., offsets of zero and one-half of a track as described above with reference to FIG. 2C).

Figure 4B:
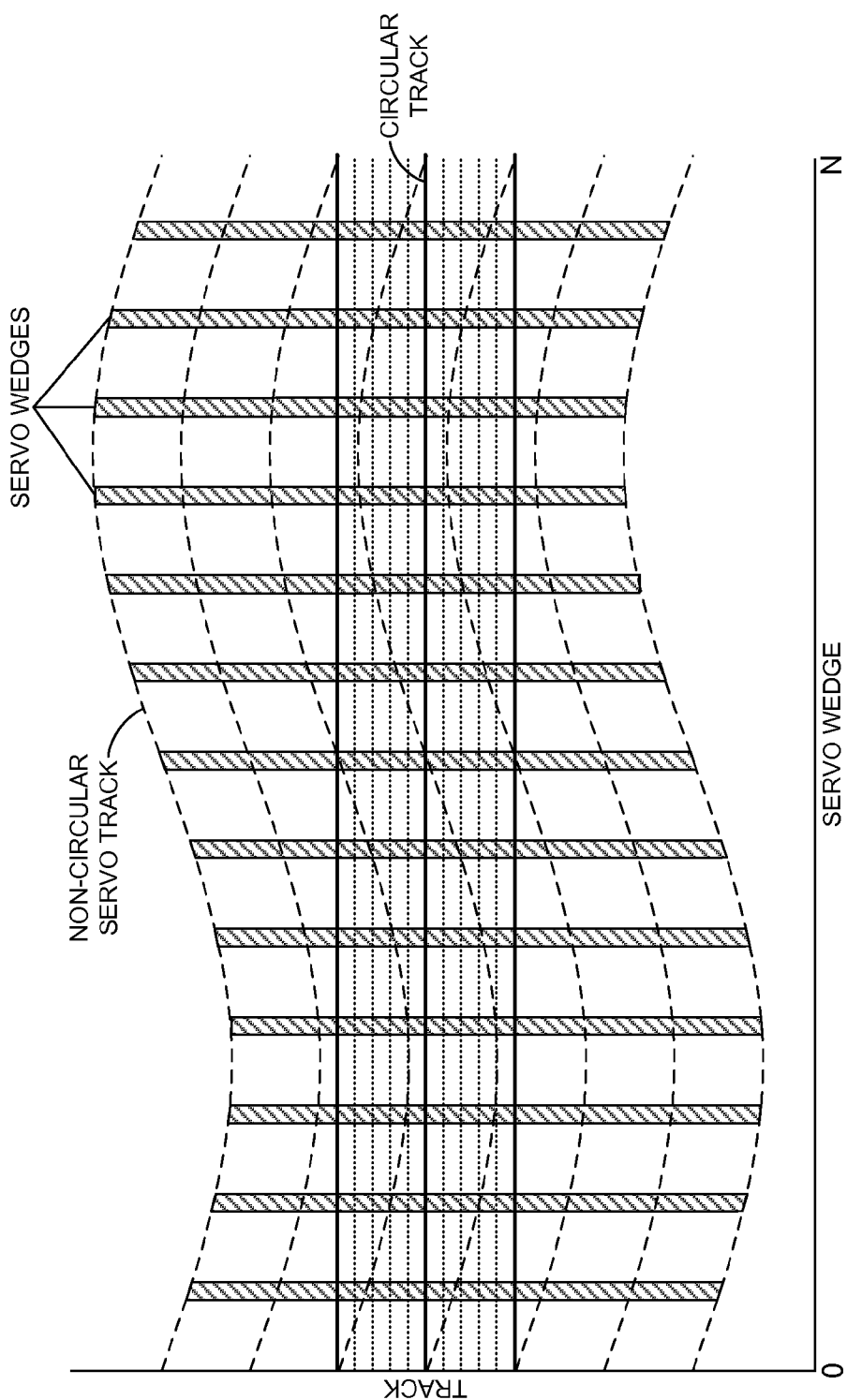
FIG. 4B illustrates a track format according to an embodiment of the present invention wherein circular tracks (servo or data) are defined by non-circular servo tracks, and a track squeeze indicator is generated by evaluating the servo bursts at multiple offsets relative to a circular track.

FIG. 4B illustrates a track format according to an embodiment of the present invention wherein non-circular servo tracks define circular tracks. When the head is positioned at the offset of one-half a track, the head will cross over the servo sectors at different points defined by the servo bursts. This is because the servo sectors will be moving (in a sinusoidal path) relative to the head due to the eccentricity of the non-circular servo tracks. Accordingly, the track squeeze indicator cannot be generated by positioning the head at a specific offset relative to a circular track (e.g., one-half a track) since the relationship of the servo bursts changes at each servo wedge.

Instead of positioning the head at specific offsets relative to a circular track as in the prior art, in the embodiments of the present invention the head is positioned at multiple offsets relative to a circular track. This is illustrated in the embodiment of FIG. 4B wherein the head is positioned at eight different offsets relative to a circular track (four offsets on either side of the circular track). In this manner, eight measurements of the servo bursts are taken for each servo sector (rather than measuring only at zero and one-half track offset as in the prior art). The eight measurements at each servo wedge are evaluated, and the measurements that will provide the best track squeeze indicator are selected. For example, the measurements that are closest to an offset corresponding to zero and one-half a track offset (of a non-circular servo track) are selected to generate the track squeeze indicator.

Figure 5:
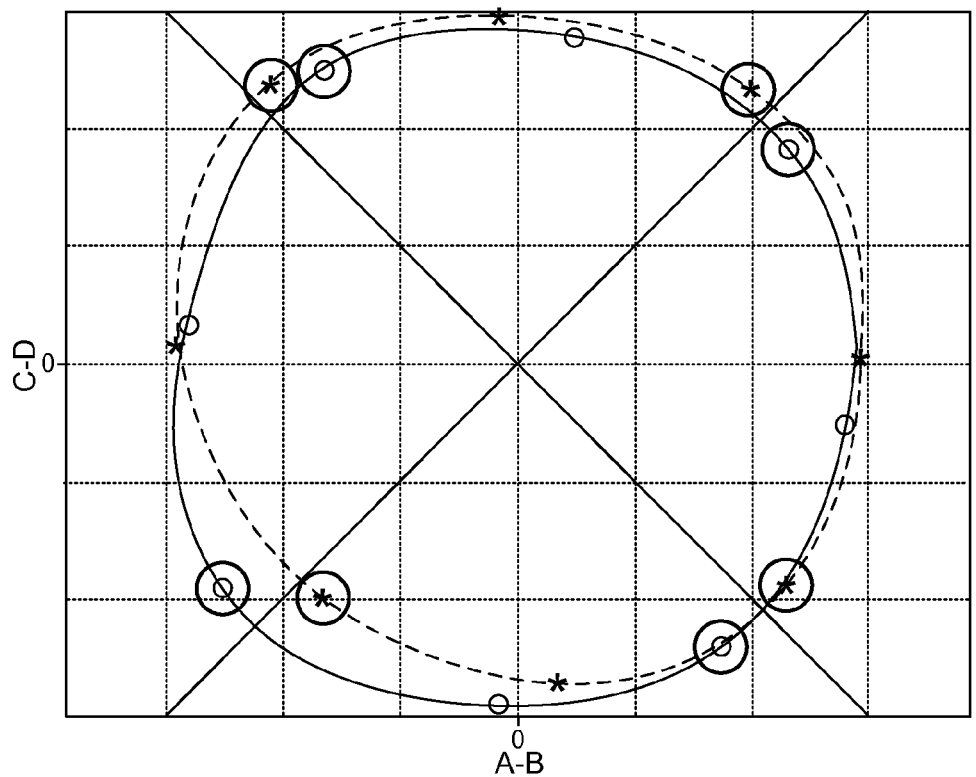
FIG. 5 shows track squeeze indicators generated at the multiple offsets shown in FIG. 4B for two different servo wedges according to an embodiment of the present invention.

FIG. 5 illustrates this embodiment wherein the solid line and corresponding samples "*" represent the eight measurements taken for one of the servo sectors, and the dashed line and corresponding "0" samples represent the eight measurements taken for a different one of the servo wedges. In this embodiment, the circled samples closest to the diagonal lines (where $|(A-B)-(C-D)|$ is smallest) are selected to generate the track squeeze indicator. Any suitable number of measurements may be taken for each servo wedge, wherein increasing the number of measurements (i.e., the number of offsets), increases the resolution which may improve the accuracy of the track squeeze indicator. In one embodiment, a circular track may cross over more than two of the non-circular servo tracks while still generating a valid track squeeze indicator as long as there is sufficient resolution in the number of measurements (number of offsets).

Figure 7:
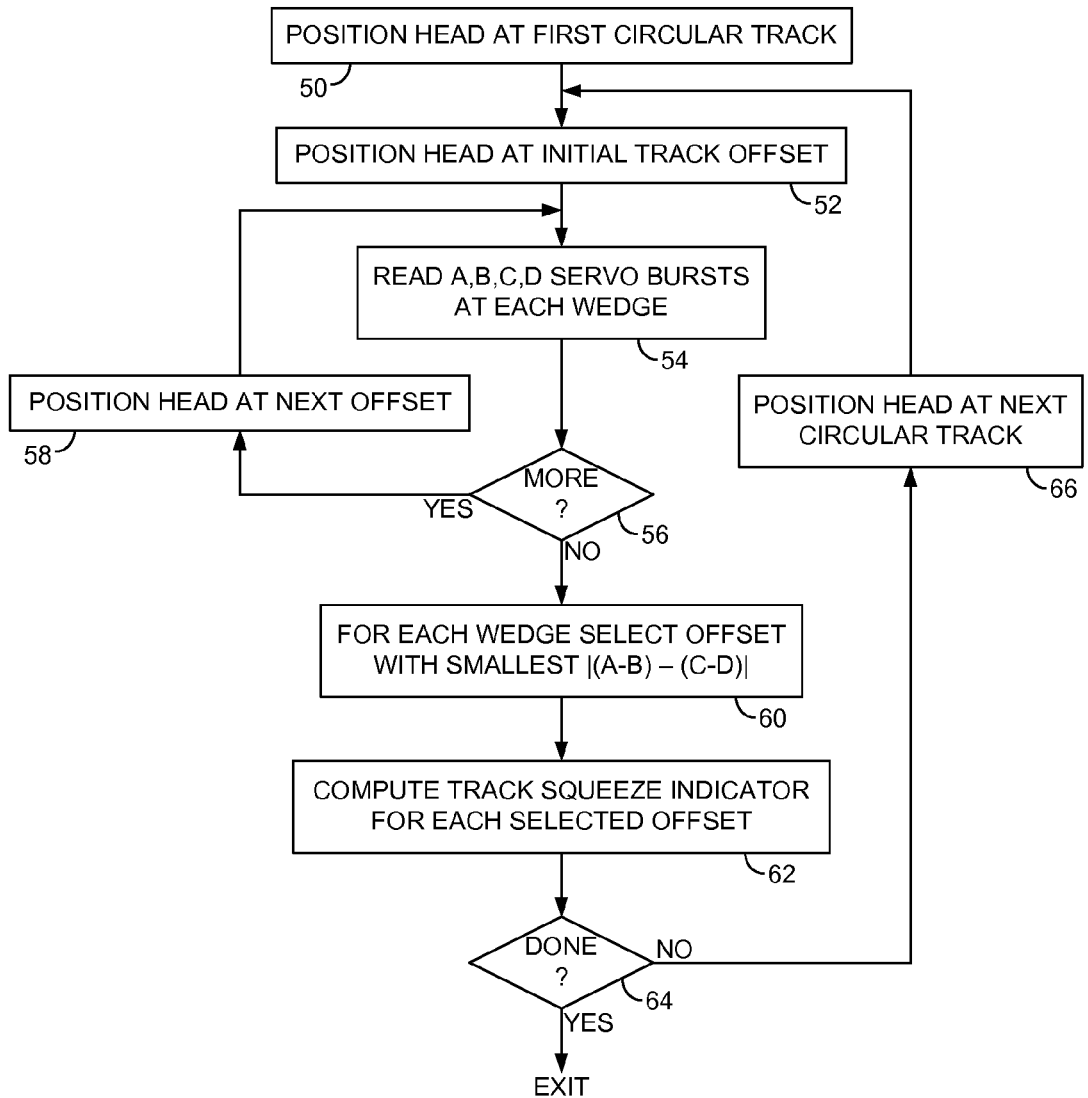
FIG. 7 is a flow diagram according to an embodiment of the present invention wherein the servo bursts are read at each offset for each servo wedge, and then the offset(s) corresponding to the smallest of |(A-B)-(C-D)| is selected for generating the track squeeze indicator.

FIG. 7 is a flow diagram according to an embodiment of the present invention for generating a track squeeze indicator for a number of the circular tracks, wherein the head is positioned at a first circular track (step 50), and then positioned at an initial track offset (step 52). The servo bursts are read at each servo wedge and the relationship generated (step 54). If there are more offsets (step 56), the head is positioned at the next offset (step 58) and the process repeated until a relationship has been generated at each offset for each of the servo wedges. For each servo wedge, at least one of the offsets is selected by evaluating the generated relationships (step 60), wherein in the embodiment of FIG. 7, the offset(s) are selected that minimize the relationship:

$$|(A-B)-(C-D)|.$$

The servo burst measurements at the selected offset(s) are then evaluated to generate a track squeeze indicator (step 62). For example, the track squeeze indicator may be generated according to:

$$(A-B)^2+(C-D)^2.$$

Figure 2D:
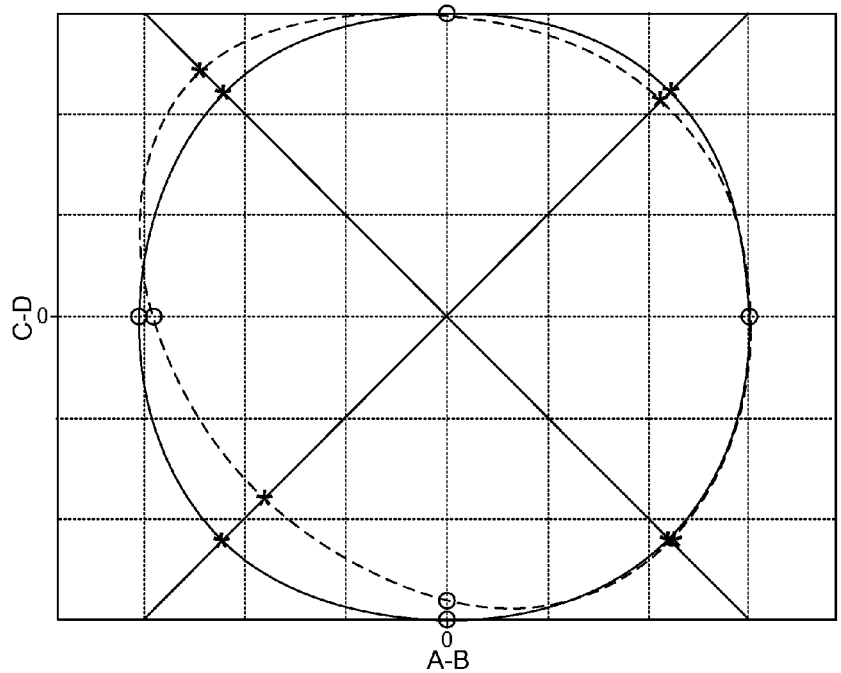

An excessive track squeeze may be detected when the result of the above equation deviates from a nominal value as described above with reference to FIGS. 2C and 2D.

The flow diagram of FIG. 7 is repeated after positioning the head over the next circular track (step 66), wherein the next circular track may be an adjacent circular track so that all of the circular tracks are tested, or a number of circular tracks may be skipped so that N/M of the circular tracks are tested. For example in one embodiment, the disk may be divided into a number of zones each comprising a number of the circular tracks, wherein a track squeeze indicator may be generated for one of the circular tracks within each zone.

Figure 8:
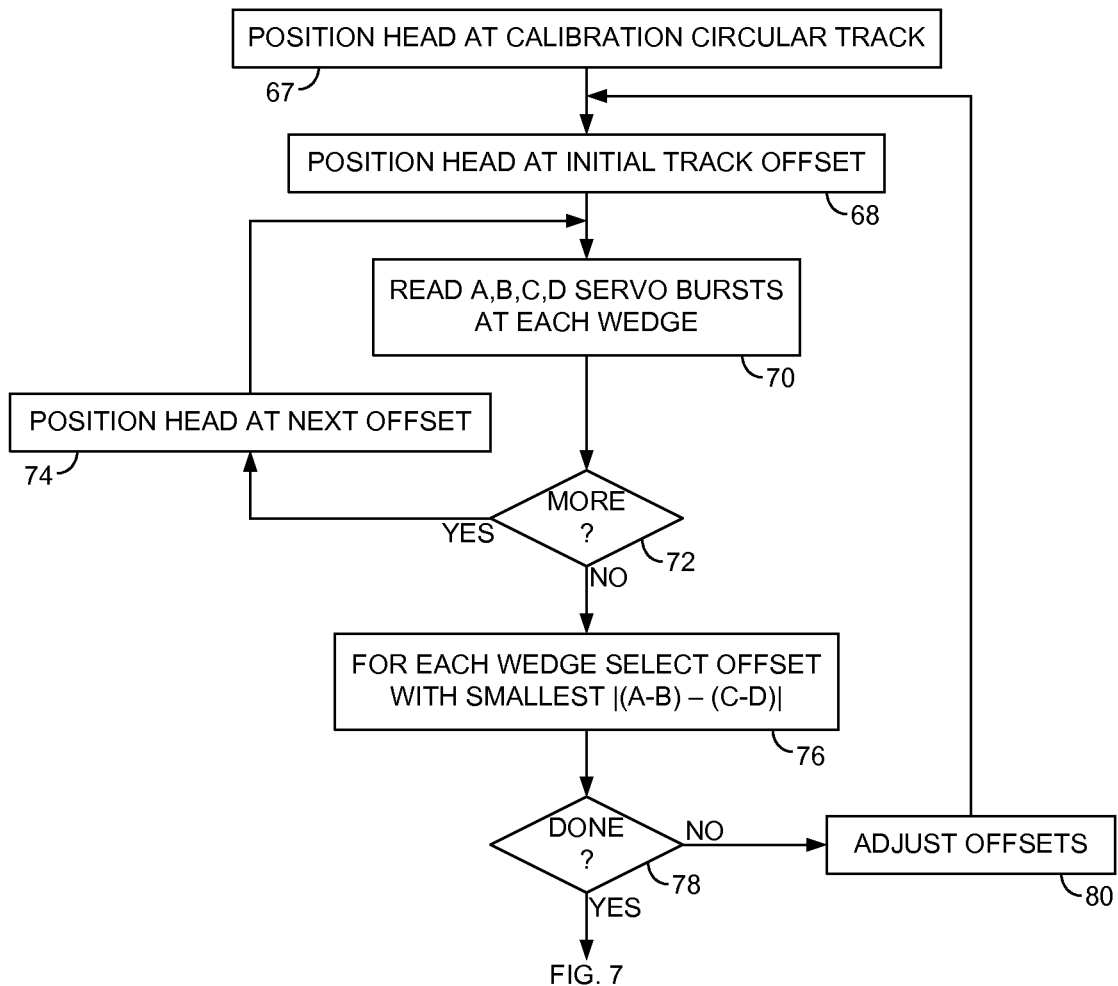
FIG. 8 is a flow diagram according to an embodiment of the present invention wherein the offsets shown in FIG. 4B are calibrated at one or more radial locations before generating the track squeeze indicators for the circular tracks.

In one embodiment, a phase of the offsets may be calibrated prior to scanning the circular tracks to generate the track squeeze indicators. For example, in the embodiment where there are four offsets on one side of a circular track (as shown in FIG. 4B), the spacing between the offsets may be adjusted until an optimal relationship of the servo bursts is generated at each servo wedge. An example of this embodiment is shown in the flow diagram of FIG. 8 wherein the head is positioned at a calibration circular track (step 67) and then positioned at an initial offset relative to the calibration track (step 68). The servo bursts are read at each servo wedge and the relationship generated (step 70). If there are more offsets (step 72), the head is positioned at the next offset (step 74) and the process repeated until a relationship has been generated at each offset for each of the servo wedges. The relationships generated at each offset for each servo wedge are evaluated (step 76) to determine whether there are suitable relationships for generating the track squeeze indicator. For example, the relationships are evaluated to verify whether a predetermined number minimize the above described relationship $|(A-B)-(C-D)|$ within an acceptable threshold. If not (step 78), then the spacing of the offsets is adjusted (step 80) and the flow diagram of FIG. 8 is repeated. Once an acceptable spacing has been determined for the offsets (step 78), the flow diagram of FIG. 7 is executed to generate a track squeeze indicator for a number of the circular tracks using the calibrated offsets.

In one embodiment, the flow diagram of FIG. 8 may be repeated to calibrate the offsets for a number of different zones, and the track squeeze indicator generated for each zone using the corresponding calibrated offsets. In yet another embodiment, the flow diagram of FIG. 8 may be executed to determine the spacing of the offsets as well as the number of offsets needed to generate an acceptable track squeeze indicator for the circular tracks, wherein reducing the number of offsets reduces the time needed to scan the circular tracks and generate the track squeeze indicator.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

In yet another embodiment, the control circuitry comprises suitable logic circuitry, such as state machine circuitry.

What is claimed is:

1. A disk drive comprising:
 a disk comprising a plurality of non-circular servo tracks for defining a plurality of substantially circular tracks, wherein:
  each non-circular servo track comprises a plurality of servo sectors defining a plurality of servo wedges; and
  each servo sector comprises a plurality of servo bursts;
 a head actuated over the disk; and
 control circuitry operable to:
  position the head at a first offset relative to a first circular track and first generate a relationship of the servo bursts for each servo wedge;
  position the head at a second offset relative to the first circular track and second generate the relationship of the servo bursts for each servo wedge;
  for each servo wedge, select between the first generated relationship at the first offset and the second generated relationship at the second offset; and
  evaluate the servo bursts at the selected offset to generate a track squeeze indicator.

2. The disk drive as recited in claim 1, wherein:
 the servo bursts comprise a quadrature servo pattern comprising A, B, C and D servo bursts; and
 the relationship comprises:

$$|(A-B)-(C-D)|.$$

3. The disk drive as recited in claim 2, wherein the control circuitry is operable to evaluate the servo bursts at the selected offset by generating the track squeeze indicator according to:

$$(A-B)^2+(C-D)^2.$$

4. The disk drive as recited in claim 1, wherein the first and second offsets are on one side of the first circular track.

5. The disk drive as recited in claim 4, wherein the control circuitry is further operable to:
 position the head at more than two offsets relative to the first circular track;
 for each offset, generate the relationship of the servo bursts for each servo wedge; and
 for each servo wedge, select between the generated relationships at each offset.

6. The disk drive as recited in claim 1, wherein the control circuitry is further operable to calibrate the first and second offsets by:
 generating an adjusted offset in response to at least one of the first and second generated relationships; and
 positioning the head at the adjusted offset relative to the first circular track and third generating the relationship of the servo bursts for each servo wedge.

7. The disk drive as recited in claim 1, wherein the first circular track crosses over more than two of the non-circular servo tracks.

8. The disk drive as recited in claim 1, wherein the control circuitry is further operable to define the substantially circular tracks by cancelling an eccentricity from a position error signal generated in response to the servo sectors.

9. A method of operating a disk drive, the disk drive comprising a head actuated over a disk comprising a plurality of non-circular servo tracks for defining a plurality of substantially circular tracks, wherein:
 each non-circular servo track comprises a plurality of servo sectors defining a plurality of servo wedges; and
 each servo sector comprises a plurality of servo bursts;

the method comprising:

positioning the head at a first offset relative to a first circular track and first generating a relationship of the servo bursts for each servo wedge;

positioning the head at a second offset relative to the first circular track and second generating the relationship of the servo bursts for each servo wedge;

for each servo wedge, selecting between the first generated relationship at the first offset and the second generated relationship at the second offset; and evaluating the servo bursts at the selected offset to generate a track squeeze indicator.

10. The method as recited in claim 9, wherein:

the servo bursts comprise a quadrature servo pattern comprising A, B, C and D servo bursts; and the relationship comprises:

$$|(A-B)-(C-D)|.$$

11. The method as recited in claim 10, further comprising evaluating the servo bursts at the selected offset by generating the track squeeze indicator according to:

$$(A-B)^2+(C-D)^2.$$

12. The method as recited in claim 9, wherein the first and second offsets are on one side of the first circular track.

13. The method as recited in claim 12, further comprising:

positioning the head at more than two offsets relative to the first circular track;

for each offset, generating the relationship of the servo bursts for each servo wedge; and for each servo wedge, selecting between the generated relationships at each offset.

14. The method as recited in claim 9, further comprising calibrating the first and second offsets by:

generating an adjusted offset in response to at least one of the first and second generated relationships; and positioning the head at the adjusted offset relative to the first circular track and third generating the relationship of the servo bursts for each servo wedge.

15. The method as recited in claim 9, wherein the first circular track crosses over more than two of the non-circular servo tracks.

16. The method as recited in claim 9, further comprising defining the substantially circular tracks by cancelling an eccentricity from a position error signal generated in response to the servo sectors.

\* \* \* \* \*